(12) United States Patent
Vora et al.

(10) Patent No.: US 10,635,562 B2
(45) Date of Patent: Apr. 28, 2020

(54) FAULT TOLERANCE IN DISTRIBUTED GRAPH PROCESSING NETWORKS

(71) Applicant: Futurewei Technologies, Inc., Plano, TX (US)

(72) Inventors: Keval Vora, Riverside, CA (US); Chen Tian, Union City, CA (US)

(73) Assignee: Futurewei Technologies, Inc., Plano, TX (US)

( * ) Notice: Subject to any disclaimer, the term of this patent is extended or adjusted under 35 U.S.C. 154(b) by 495 days.

(21) Appl. No.: 15/174,356

(22) Filed: Jun. 6, 2016

(65) Prior Publication Data

US 2017/0068606 A1    Mar. 9, 2017

Related U.S. Application Data

(60) Provisional application No. 62/214,733, filed on Sep. 4, 2015.

(51) Int. Cl.
*G06F 11/14* (2006.01)
*G06F 11/32* (2006.01)
(Continued)

(52) U.S. Cl.
CPC ........ *G06F 11/323* (2013.01); *G06F 11/1407* (2013.01); *G06F 11/1438* (2013.01); *G06F 11/1451* (2013.01); *G06F 11/1471* (2013.01); *G06F 11/2025* (2013.01); *G06F 11/2035* (2013.01); *G06F 11/0757* (2013.01); *G06F 11/2097* (2013.01); *G06F 2201/84* (2013.01); *G06F 2201/855* (2013.01)

(58) Field of Classification Search
CPC ............. G06F 11/1407; G06F 11/1451; G06F 11/1471
See application file for complete search history.

(56) References Cited

U.S. PATENT DOCUMENTS 8,862,743 B1    10/2014  Petrescu-Prahova et al.
9,026,850 B1 *   5/2015  Malewicz ......... G06F 17/30958
                                                          714/15

(Continued)

FOREIGN PATENT DOCUMENTS

CN    104392010 A      3/2015
CN    104618153 A  *   5/2015
CN    104618153 A      5/2015

OTHER PUBLICATIONS

Low, Yucheng et al. "Distributed GraphLab: A Framework for Machine Learning and Data Mining in the Cloud". Proceedings of the VLDB Endowment, vol. 5, No. 8. Apr. 2012. pp. 716-727.*

(Continued)

*Primary Examiner* — Yolanda L Wilson
(74) *Attorney, Agent, or Firm* — Conley Rose, P.C.

(57) ABSTRACT

A first device comprises: a memory configured to store a first sub-graph that is part of a distributed graph associated with a distributed graph processing network; a processor coupled to the memory and configured to: process the first sub-graph; and save, independently of a second device in the distributed graph processing network, a first snapshot of a first execution state of the first device at a first iteration time; and a transmitter coupled to the processor and configured to transmit the first snapshot to the second device or to a third device.

19 Claims, 11 Drawing Sheets

(51) Int. Cl.
*G06F 11/20* (2006.01)
*G06F 11/07* (2006.01)

(56) References Cited

U.S. PATENT DOCUMENTS

| | | | | |
|---|---|---|---|---|
| 9,727,425 | B1* | 8/2017 | Malewicz | G06F 11/1469 |
| 2006/0173350 | A1* | 8/2006 | Yuan | A61B 8/12 600/466 |
| 2010/0005147 | A1* | 1/2010 | Johnson, III | G06F 9/546 709/206 |
| 2014/0019490 | A1 | 1/2014 | Roy et al. | |
| 2014/0222871 | A1 | 8/2014 | Qi et al. | |
| 2015/0006606 | A1* | 1/2015 | Fleury | G06F 9/546 709/201 |

OTHER PUBLICATIONS

Laadan, Oren et al. "Transparent Checkpoint-Restart of Distributed Applications on Commodity Clusters". IEEE International Conference on Cluster Computing (Cluster 2005). Sep. 2005.*
Gao, Yanping et al. "An Adaptive Index-based Algorithm using Time-coordination in Mobile Computing". IEEE. May 2008. pp. 578-585.*
Partial English Translation and Abstract of Chinese Patent Application No. CN104392010, Mar. 4, 2015, 20 pages.
Partial English Translation and Abstract of Chinese Patent Application No. CN104618153, May 13, 2015, 8 pages.
Foreign Communication From a Counterpart Application, PCT Application No. PCT/CN2016/097377, English Translation of International Search Report dated Nov. 22, 2016, 4 pages.
Gonzalez, J. E., et al, "GraphX: Graph Processing in a Distributed Dataflow Framework," USENIX Association, Proceedings of the 11th USENIX Symposium on Operating Systems Design and Implementation (OSDI'14), Oct. 6, 2014, Broomfield, CO, 978-1-931971-16-4, pp. 599-613.
Low, Y., et al, "Distributed GraphLab: A Framework for Machine Learning and Data Mining in the Cloud," Proceedings of the VLDB Endowment, vol. 5, No. 8, The 38th International Conference on Very Large Data Bases, Aug. 27, 2012, Istanbul, Turkey, pp. 716-727.
Malewicz, G., et al, "Pregel: A System for Large-Scale Graph Processing," SIGMOD'10, Jun. 6, 2010, Indianapolis, Indiana, USA, pp. 135-145.
Salihoglu, S., et al, "GPS: A Graph Processing System," Stanford University, Supported by the National Science Foundation (IIS-0904497), a KAUST research grant, and a research grant from Amazon Web Services, 2013, pp. 1-31.
Vora, K., et al, "ASPIRE: Exploiting Asynchronous Parallelism in Iterative Algorithms using a Relaxed Consistency based DSM," OOPSLA'14, Oct. 19, 2014, Portland, OR, USA, pp. 861-878.
Wang, P., et al, "Replication-based Fault-tolerance for Large-scale Graph Processing," Jun. 23, 2014, 12 pages.
Zaharia, M., et al, "Resilient Distributed Datasets: A Fault-Tolerant Abstraction for In-Memory Cluster Computing," University of California, Berkeley, Jul. 19, 2011, 14 pages.
Gonzalez, J., et al., "PowerGraph: Distributed Graph-Parallel Computation on Natural Graphs," XP055492378, Proceedings of the 10th USENIX Symposium on Operating Systems Design and Implementation, Oct. 8, 2012, 14 pages.
Foreign Communication From a Counterpart Application, European Application No. 16840812.8, Partial Supplementary European Search Report dated Jul. 24, 2018, 15 pages.
Silva, M, et al., "Checkpointing SPMD Applications on Transputer Networks," XP010099015, Proceedings of the Scalable High-Performance Computing Conference, May 23, 1994, pp. 694-701.
Laadan, O., et al., "Transparent Checkpoint-Restart of Distributed Applications on Commodity Clusters," XP031078088, IEEE International Cluster Computing, Sep. 2005, pp. 1-13.
Gao, Y., et al., "An Adaptive Index-Based Algorithm Using Time-coordination in Mobile Computing," XP031922849, Notice of Violation of IEEE Publication Principles, International Symposium on Information Processing, May 23, 2008, pp. 578-585.
Liu, Q., et al., "SAND:A Fault-Tolerant Streaming Architecture for Network Traffic Analytics," XP032646985, 44th Annual IEEE/IFIP International Conference on Dependable Systems and Networks, Jun. 23, 2014, pp. 80-87.
Shen, Y., et al., "Fast Failure Recovery in Distributed Graph Processing Systems," XP055492393, Proceedings of the VLDB Endowment, vol. 8, No. 4, Dec. 2014, pp. 437-448.
Alexandrov, A., et al., "The Stratosphere platform for big data analytics," XP058062348, The VLDB Journal, vol. 23, No. 6, Dec. 2014, pp. 939-964.
Foreign Communication From a Counterpart Application, European Application No. 16840812.8, Extended European Search Report dated Dec. 19, 2018, 22 pages.
Foreign Communication From a Counterpart Application, Chinese Application No. 201680051428.6, Chinese Office Action dated Nov. 12, 2019, 9 pages.
Foreign Communication From a Counterpart Application, Chinese Application No. 201680051428.6, Chinese Search Report dated Nov. 4, 2019, 3 pages.

* cited by examiner

| Checkpoint | Globally Consistent Checkpointing and Maximum Recovery | | Globally Inconsistent Checkpointing and Minimum Recovery | |
|---|---|---|---|---|
| | Time | Savings | Time | Savings |
| Never | 130 seconds | 16.7% | 115 seconds | 23.8% |
| After 30 seconds | 110 seconds | 26.2% | 84 seconds | 38.6% |

FAULT TOLERANCE IN DISTRIBUTED GRAPH PROCESSING NETWORKS

CROSS-REFERENCE TO RELATED APPLICATIONS

This application claims priority to U.S. provisional patent application No. 62/214,733 filed Sep. 4, 2015 by Keval Vora, et al., and titled "Globally Inconsistent Checkpointing and Recovery Based Fault Tolerance (GIFT)," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In data processing, a graph is a representation of individual entities and their relationships. Vertices of the graph represent the entities, and edges of the graph represent the relationships. Representing data in a graph may simplify processing of the data and make the relationships more apparent. In addition, graph processing is a mature field, so processing algorithms are well understood, developed, and applied. However, when a graph is large and highly connected, a single device or node may not be able to process all of the data. Thus, multiple nodes may be needed to process the graph in a distributed graph pocessing network. The nodes may be in a data center or other environment where multiple nodes communicate.

SUMMARY

Current fault tolerance approaches may be slow and may not allow for asynchronous processing. According to various embodiments of the present disclosure, fault tolerance is provided. The fault tolerance implements globally inconsistent checkpointing and asynchronous minimum recovery. The embodiments provide a faster recovery from device failures, reduce peak bandwidth utilization during checkpointing, provide faster checkpointing, and enable fine tuning of checkpointing frequency. The reduced peak bandwidth utilization allows devices that are implementing distributed graph processing applications to simultaneously process other applications. For heterogeneous distributed graph processing networks with devices that have different reliability guarantees and other different features, the fine tuning of the checkpointing frequency allows for checkpointing based on those different reliability guarantees and other different features.

In on embodiment, a first device comprises: a memory configured to store a first sub-graph that is part of a distributed graph associated with a distributed graph processing network; a processor coupled to the memory and configured to: process the first sub-graph; and save, independently of a second device in the distributed graph processing network, a first snapshot of a first execution state of the first device at a first iteration time; and a transmitter coupled to the processor and configured to transmit the first snapshot to the second device or to a third device. In some embodiments, the processor is further configured to further process the first sub-graph in an asynchronous manner; the second device is a distributed graph processing device; wherein the third device is a controller; the processor is further configured to save snapshots based on how frequently the first device fails; the processor is further configured to save a second snapshot of a second execution state of the first device at a second iteration time that is independent of the second device; wherein the processor is further configured to save a third snapshot of a third execution state of the first device at a third iteration time that is independent of the second device so that a first interval between the first iteration time and the second iteration time is different from a second interval between the second iteration time and the third iteration time; the second iteration time ensures compliance with a maximum staleness; the first device further comprises a receiver configured to receive an instruction to implement the maximum staleness.

In another embodiment, a controller comprises: a memory; a processor coupled to the memory and configured to: generate a first instruction for a first device to save a first snapshot at a first iteration time during a first checkpoint, and generate a second instruction for a second device to save a second snapshot at a second iteration time during the first checkpoint; and a transmitter coupled to the processor and configured to: transmit the first instruction to the first device, and transmit the second instruction to the second device. In some embodiments, the processor is further configured to generate a third instruction indicating a maximum staleness of snapshots, and wherein the transmitter is further configured to transmit the third instruction to the first device and the second device; the processor is further configured to generate a processing instruction instructing asynchronous processing with a correctness constraint, wherein the correctness constraint means that, once the first device or the second device reads a vertex value, the first device or the second device cannot read any prior vertex values, and wherein the transmitter is further configured to transmit the processing instruction to the first device and the second device; the first instruction instructs the first device to transmit the first snapshot to the second device; when the controller does not receive a heartbeat message from the first device at an expected time, the processor is further configured to generate a third instruction for the second device to perform a minimum recovery using the first snapshot; the processor is further configured to generate a third instruction for a third device to save a third snapshot at the first iteration time, the second iteration time, or a third iteration time during the first checkpoint, and wherein the transmitter is further configured to transmit the third instruction to the third device; when the controller does not receive a first heartbeat message from the first device at a first expected time, when the controller does not receive a second heartbeat message from the second device at a second expected time, and when the first iteration time is before the second iteration time, the processor is further configured to generate an instruction for the third device to initiate a minimum recovery beginning with the first device.

In yet another embodiment, a method implemented in a first device, the method comprises: storing a first sub-graph that is associated with the first device and is part of a distributed graph associated with a distributed graph processing network; processing the first sub-graph; saving, independently of a second device in the distributed graph processing network, a first snapshot of a first execution state of the first device at a first iteration time; and transmitting the first snapshot to the second device or to a third device. In some embodiments, the method further comprises further processing the first sub-graph in an asynchronous manner; the method further comprises receiving a second snapshot of a second execution state of the second device at a second iteration time; the method further comprises determining that the second device failed; and processing until convergence a second sub-graph that is associated with the second device and is part of the distributed graph.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 9 is a graph illustrating the performance of globally inconsistent checkpointing and minimum recovery.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
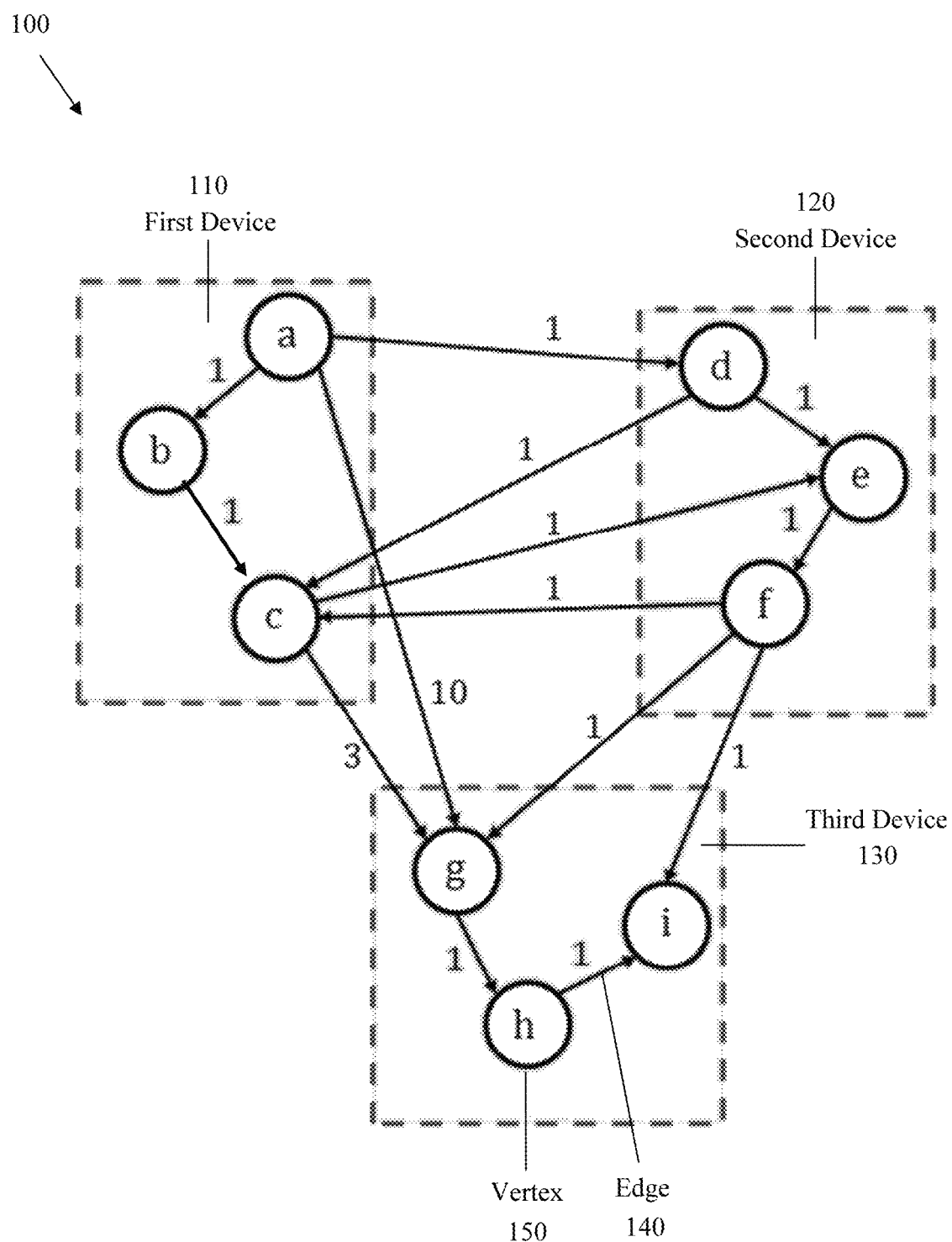
FIG. 1 is a schematic diagram of a distributed graph processing network.

FIG. 1 is a schematic diagram of a distributed graph processing network 100. The network 100 comprises a first device 110, a second device 120, and a third device 130, which comprise vertices 150 coupled to each other via edges 140. The devices 110-130 are any suitable computing devices or are any logical or physical partitions of such computing devices. The devices 110-130 process a distributed graph. The vertices 150 represent entities, and the edges 140 represent relationships between the entities. The edges 140 may have any arbitrary values that are particular to a problem that is to be solved. As a first example, the vertices 150 are users of a social media network, and the edges 140 are friendships among the users. As a second example, the vertices 150 are webpages, and the edges 140 are hyperlinks among the webpages.

Figure 2:
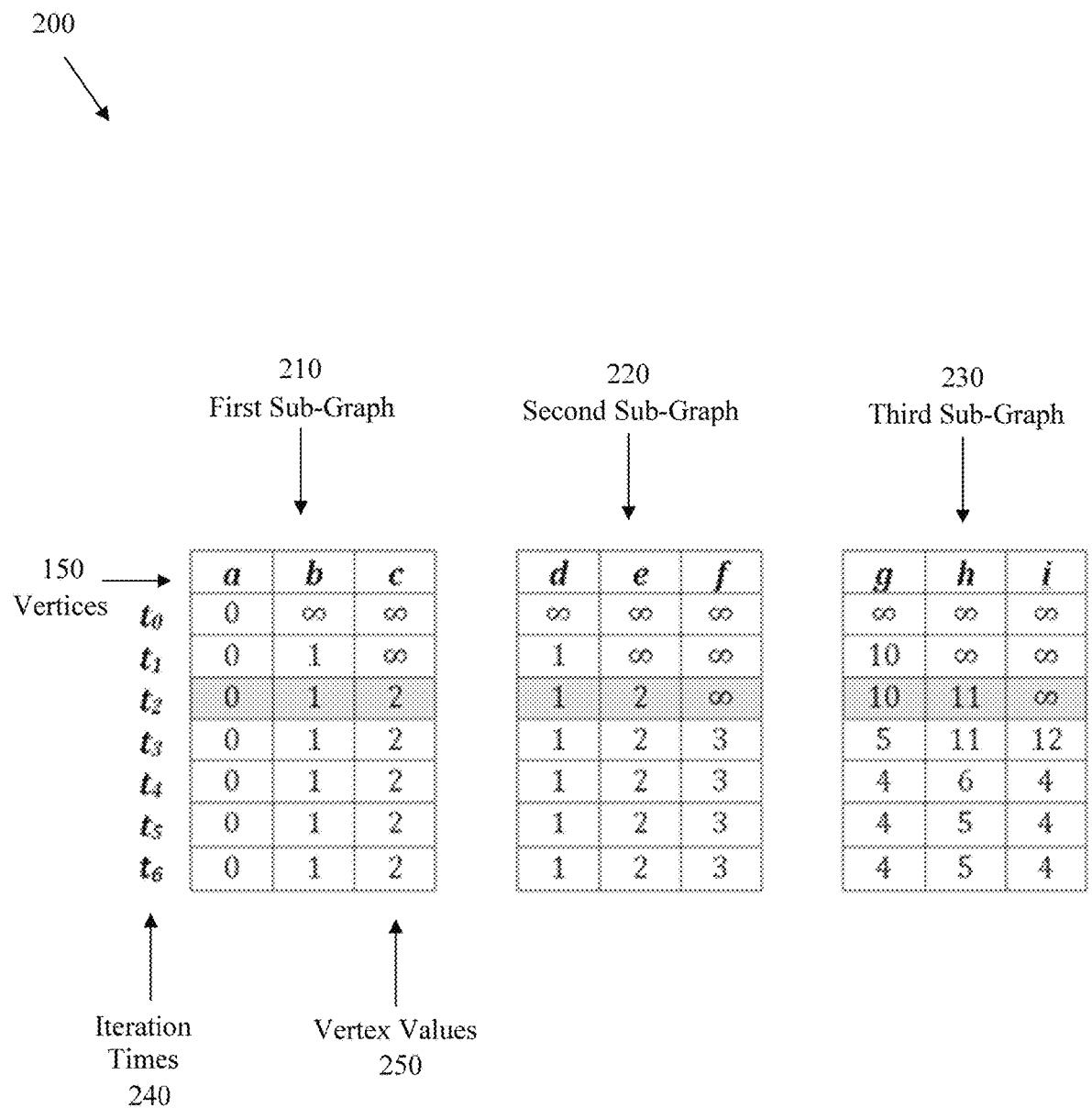
FIG. 2 is a distributed graph.

FIG. 2 is a distributed graph 200. The graph 200 comprises a first sub-graph 210, a second sub-graph 220, and a third sub-graph 230 corresponding to the first device 110, the second device 120, and the third device 130, respectively. Thus, the first device 110 processes the first sub-graph 210, the second device 120 processes the second sub-graph 220, and the third device 130 processes the third sub-graph 230. The processing may be done in a distributed manner. In FIG. 2, the vertex values 250 are from the perspective of a primary vertex 150, vertex A, to other secondary vertices 150 and are constants representing a sum of values associated with the edges 140. However, other distributed graphs may be from the perspective of another primary vertex 150 to other secondary vertices 150. Continuing with the social media network example, the vertex values 250 represent a number of friends between two vertices 150, vertex A and the other vertices 150.

For an iteration time 240 at $t_0$, no hops between vertices 150 are allowed. An iteration refers to a process of a device updating its execution state. An execution state is some or all of the data stored in a device, or a logical partition or physical partition of the device, at a given point in time. The first device 110 calculates a vertex value 250 between vertex A and vertex A, which is 0 because there are no edges between vertex A and itself. The first device 110 cannot calculate a vertex value 250 between vertex A and vertex B because that path requires one hop from vertex A to vertex B, so the first device 110 sets the vertex value 250 between vertex A and vertex B to infinity (∞). The devices 110-130 calculate vertex values 250 for the remaining vertices 150 in a similar manner.

For the iteration time 240 at $t_1$, one hop between vertices 150 is allowed. The first device 110 calculates a vertex value 250 between vertex A and vertex A, which is still 0. The first device 110 also calculates a vertex value 250 between vertex A and vertex B, which is 1. The first device 110 cannot calculate a vertex value 250 between vertex A and vertex C because that path requires two hops, a first hop from vertex A to vertex B and a second hop from vertex B to vertex C, so the first device 110 sets the vertex value 250 between vertex B and vertex C to infinity. The second device 120 and the third device 130 calculate vertex values 250 for the remaining vertices 150 in a similar manner.

The devices 110-130 calculate vertex values 250 for each remaining iteration time 240 at $t_2$-$t_6$ in a similar manner. For each vertex 150, the devices 110-130 know the value of the edges 140 from preceding vertices 150. The devices 110-130 know those values because they continuously communicate among each other packets indicating those values and the vertex values 250. The devices 110-130 update their respective sub-graphs 210-230 each time they calculate a lower vertex value 250. For example, at the iteration time 240 at $t_2$, only two hops are allowed, so the only available path from vertex A to vertex G is over the edge 140 with a value of 10. Going from vertex A to vertex B, vertex C, and vertex G requires three hops; going from vertex A to vertex D, vertex E, vertex F, and vertex G requires four hops; and going from vertex A to vertex D, vertex E, vertex F, vertex I, vertex H, and vertex G requires six hops. However, at the iteration time 240 at $t_3$, three hops are allowed, so the path from vertex A to vertex B, vertex C, and vertex G is available. The vertex value 250 for that path is 5 (1+1+3), so the third device 130 updates the vertex value 250 for vertex G in the third sub-graph 230 from 10 to 5. The third device 130 then transmits packets to the other devices 110-120, indicating the updated vertex value 250 for vertex G so that that the vertex value 250 is available to the other devices 110-120 in subsequent iterations. The devices 110-130 continue iterating until convergence, which is the iteration time 240 by which the vertex values 250 do not change. As can be seen, the vertex values 250 for the iteration times 240 at $t_5$ and time $t_6$ are the same, so the devices 110-130 stop iterating after the iteration time 240 at $t_6$ because the vertex values 250 have converged at that iteration time 240.

Figure 3:
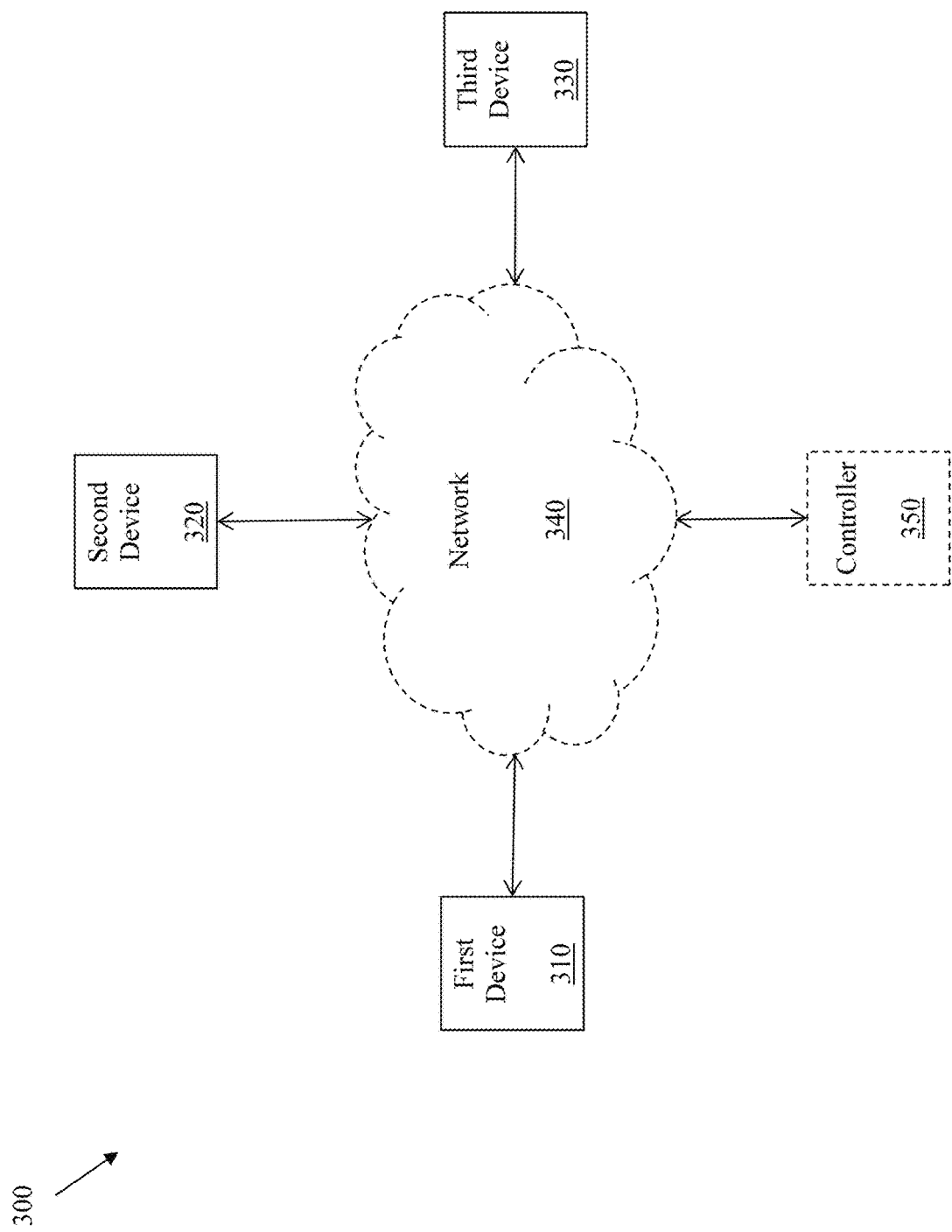
FIG. 3 is a schematic diagram of another distributed graph processing network.

FIG. 3 is a schematic diagram of another distributed graph processing network 300. The network 300 is similar to the network 100 in FIG. 1. Specifically, the network 300 comprises a first device 310, a second device 320, and a third device 330, which are similar to the first device 110, the second device 120, and the third device 130. However, unlike the network 100, the network 300 further comprises a network 340 and a controller 350. The network 340 may be the Internet or another network, and the controller 350 controls the devices 310-330 as described further below. The network 340 and the controller 350 comprise dashed lines to indicate that they are optional. Thus, while the controller 350 is described as performing various functions, the devices 310-330 or other components not shown may perform those functions based on communication among the devices 310-330 or the other components, a protocol, or another suitable means. Though the network 300 is shown as comprising three devices 310-330, the network 300 may comprise any suitable number of devices. There are two main ways for the network 300 to process graphs, namely synchronous processing and asynchronous processing.

Figure 4:
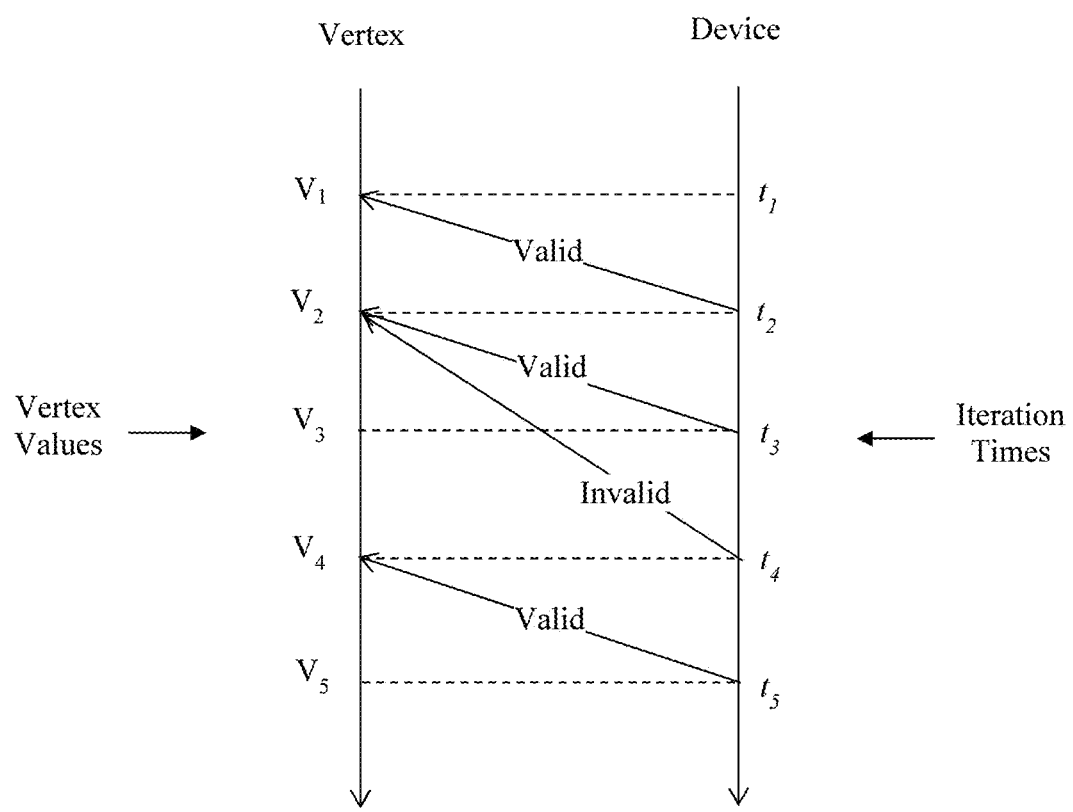
FIG. 4 is a timing diagram demonstrating synchronous processing.

FIG. 4 is a timing diagram 400 demonstrating synchronous processing. The timing diagram 400 shows two vertical lines, a first vertical line representing a vertex such as the vertices 150 and a second vertical line representing a device such as the devices 110-130 and 310-330. The first vertical line progresses through a sequence of vertex values $V_1$-$V_5$ such as the vertex values 250, and the second vertical line progresses through a sequence of iteration times $t_1$-$t_5$ such as the iteration times 240. Synchronous processing means that the device's processing at $t_i$ is based on vertex values from $t_{i-1}$. In other words, synchronous processing uses a read-after-write dependency, meaning that the device reads the last vertex value that the device wrote. Thus, at $t_2$ vertex value $V_1$ is valid. Similarly, at $t_3$ vertex value $V_2$ is valid, and at $t_5$ vertex value $V_4$ is valid. However, at $t_4$ vertex value $V_2$ is invalid because the vertex value $V_2$ is from $t_2$, which is two iteration times before $t_4$ and therefore not permitted.

Figure 5:
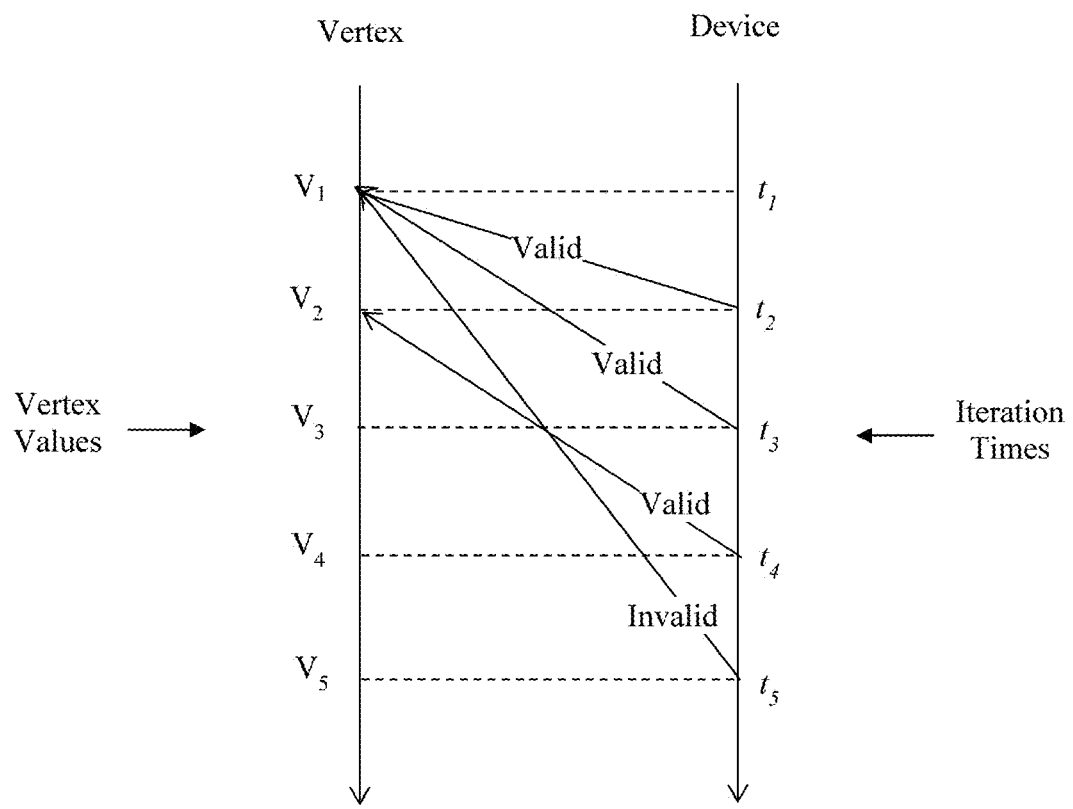
FIG. 5 is a timing diagram demonstrating asynchronous processing.

FIG. 5 is a timing diagram 500 demonstrating asynchronous processing. The timing diagram 500 is similar to the timing diagram 400 in FIG. 4. The timing diagram 500 shows two vertical lines, a first vertical line representing a vertex such as the vertices 150 and a second vertical line representing a device such as the devices 110-130 and 310-330. Asynchronous processing means that the device's processing at $t_i$ is based on available vertex values. Asynchronous processing therefore relaxes the read-after-write dependency of synchronous processing to allow for processing stale vertex values, which are vertex values before $t_{i-1}$. However, asynchronous processing uses a correctness constraint, meaning that, once the device reads a vertex value, the device does not read any prior vertex values. This correctness constraint may also be referred to as progressive reading. Thus, at $t_2$ the vertex value $V_1$ is valid. Similarly, at $t_3$ the vertex value $V_1$ is valid, and at $t_4$ the vertex value $V_2$ is valid. However, at $t_5$ the vertex value $V_1$ is invalid because the vertex value $V_1$ is prior to the vertex value $V_2$.

Returning to FIG. 3, the network 300 implements checkpointing and recovery in order to tolerate failures of the devices 310-330. Checkpointing is the process of saving snapshots of execution states at defined checkpoints of time. A snapshot is a collection of inputs, including vertex values, as well as the vertices and edges used to calculate the vertex values. For example, when the first device 310 takes a snapshot, that snapshot includes inputs for a sub-graph that the first device 310 is responsible for, as well as inputs for sub-graphs that the devices 320-330 are responsible for and that the first device 310 collects from the devices 320-330. A checkpoint is a period of time in which all devices that are processing the same distributed graph either save or both save and transmit a snapshot. A failure is an event where one of the devices 310-330 is unable to continue processing and where the data from that device 310-330 are inaccessible. In FIG. 2, the shading indicates that the devices 110-130 saved snapshots of their execution states after completing processing for the iteration time 240 at $t_2$. The execution states include the vertex values 250 of 0, 1, 2, 1, 2, ∞, 10, 11, ∞. The devices 310-330 perform checkpointing at pre-determined times, upon receiving instructions from the controller 350, or at other suitable times. Upon saving the snapshots, the devices 310-330 transmit the snapshots to each other, the controller 350, or another suitable device. The devices 310-330 do so because, if they saved snapshots locally, then those snapshots would not be available upon failures of the devices 310-330.

There are four main types of checkpointing, namely synchronous checkpointing, asynchronous checkpointing, globally consistent checkpointing, and globally inconsistent checkpointing. For synchronous checkpointing, each of the devices 310-330 ceases calculations while it performs checkpointing. For asynchronous checkpointing, each of the devices 310-330 continues calculations while it simultaneously and incrementally constructs snapshots.

Figure 6:
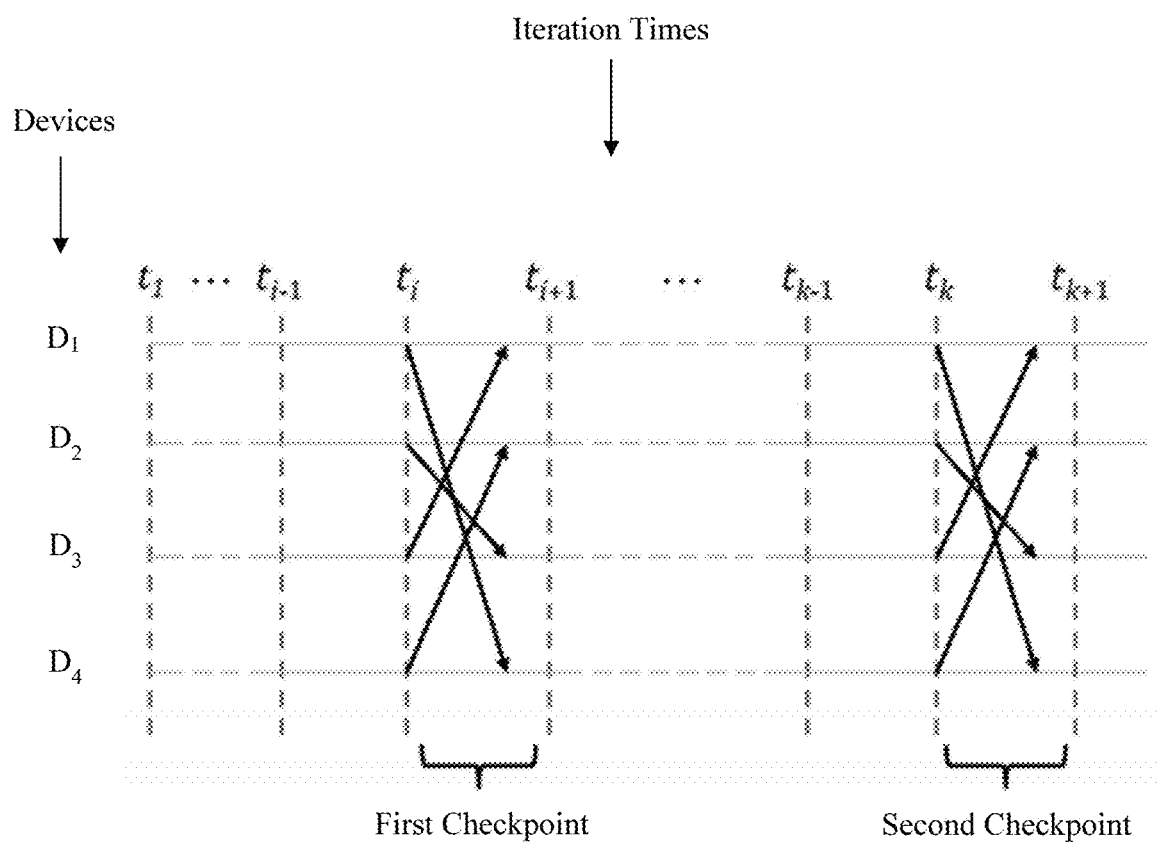
FIG. 6 is a timing diagram of globally consistent checkpointing.

FIG. 6 is a timing diagram 600 of globally consistent checkpointing. The diagram 600 shows iteration times $t_1$-$t_{k+1}$ such as the iteration times 240 progressing sequentially from left to right and shows devices $D_1$-$D_4$, such as the devices 110-130 and 310-330, progressing sequentially from top to bottom. Globally consistent checkpointing means that each of a plurality of devices saves snapshots at the same iteration time. Thus, at the iteration time $t_i$ each of the devices $D_1$, $D_2$, $D_3$, and $D_4$ saves a first snapshot. In addition, the device $D_1$ transmits its first snapshot to the device $D_4$, the device $D_2$ transmits its first snapshot to the device $D_3$, the device $D_3$ transmits its first snapshot to the device $D_1$, and the device $D_4$ transmits its first snapshot to the device $D_2$. The time period from iteration time $t_i$ to iteration time $t_{i+1}$ in which each of the devices $D_1$-$D_4$ saves and transmits its first snapshot is referred to as a first checkpoint. Similarly, at the iteration time $t_k$ each of the devices saves and transmits a second snapshot. Once again, the device $D_1$ transmits its second snapshot to the device $D_4$, the device $D_2$ transmits its second snapshot to the device $D_3$, the device $D_3$ transmits its second snapshot to the device $D_1$, and the device $D_4$ transmits its second snapshot to the device $D_2$. The time period from iteration time $t_k$ to iteration time $t_{k+1}$ in which each of the devices $D_1$-$D_4$ saves and transmits its second snapshot is referred to as a second checkpoint. Globally consistent checkpointing increases peak bandwidth usage because all devices are calculating and messaging at the same time. Globally consistent checkpointing therefore slows down the checkpointing process.

Furthermore, at pre-determined times, upon receiving instructions from the controller 350, or at other suitable times, the devices 310-330 transmit heartbeat messages to the controller 350 in order to indicate that the devices 310-330 are still "alive" and functioning properly. If the controller 350 does not receive at an expected time a heartbeat message from one of the devices 310-330, for instance the first device 310, then the controller 350 determines that the first device 310 has failed. The controller 350 then commands the devices 320-330 to perform maximum recoveries by rolling back to the devices' 320-330 last snapshots. In addition, the controller 350 instructs one of the devices 320-330 to assume the processing of a sub-graph associated with the first device 310 or instructs the devices 320-330 to jointly assume the processing of the sub-graph associated with the first device 310 in a distributed manner. In the former case, the second device 320 or the third device 330 that received a snapshot from the first device 310 assumes the processing. In the latter case, both the second device 320 and the third device 330 may have received the snapshot from the first device 310, or the controller 350 may instruct the devices 320-330 to communicate the snapshot to each other. The controller 350 may command the devices 310-330 to perform recoveries at any other suitable times as well. Those recoveries avoid the devices 310-330 from having to restart from the beginning of graph processing, so those recoveries conserve time, computing resources, and network resources. A maximum recovery means that all of the available devices 310-330, meaning the devices 310-330 that do not fail, roll back to their last snapshots. Thus, the devices 310-330 that do not fail will unnecessarily roll back to their last snapshots even though they have current vertex values. Minimum recovery means that less than all available devices 310-330 roll back to their last snapshots. However, current minimum recovery approaches are valid only for synchronous processing.

Disclosed herein are embodiments for fault tolerance implementing globally inconsistent checkpointing and asynchronous minimum recovery. The embodiments provide a faster recovery from device failures, reduce peak bandwidth utilization during checkpointing, provide faster checkpointing, and enable fine tuning of checkpointing frequency. The reduced peak bandwidth utilization allows devices that are implementing distributed graph processing applications to simultaneously process other applications. For heterogeneous distributed graph processing networks with devices that have different reliability guarantees and other different features, the fine tuning of the checkpointing frequency allows for checkpointing based on those different reliability guarantees and other different features.

Figure 7:
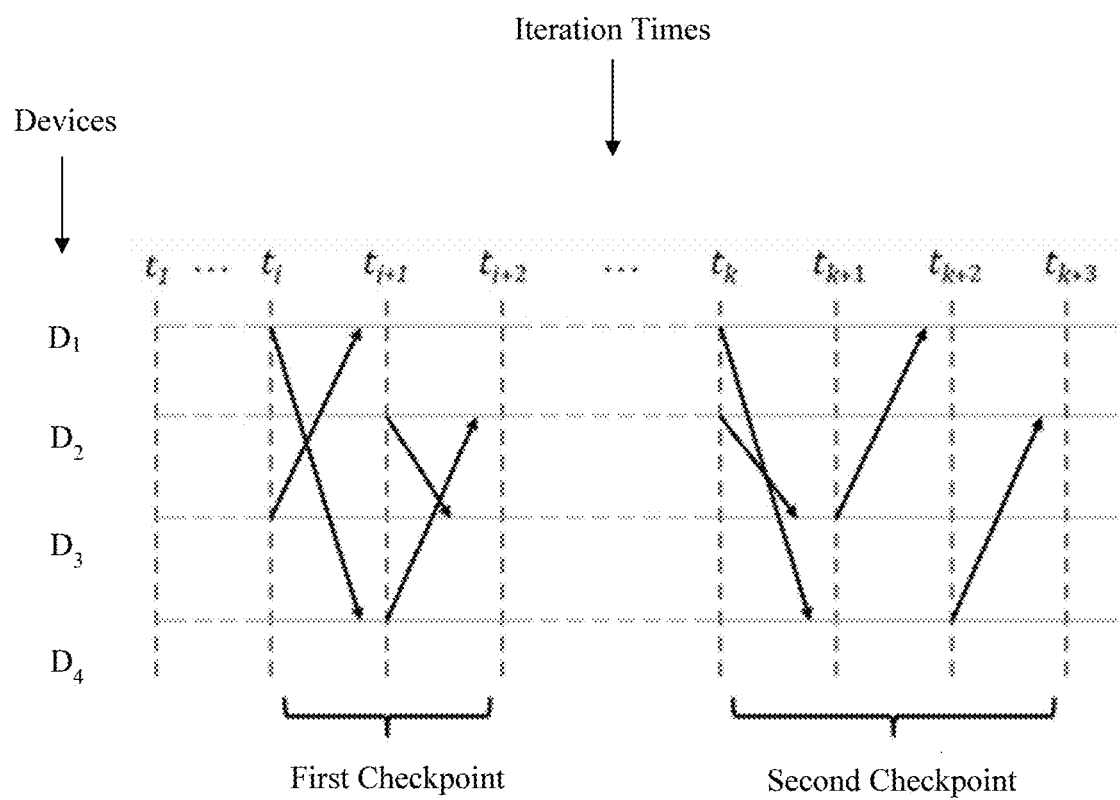
FIG. 7 is a timing diagram of globally inconsistent checkpointing according to an embodiment of the disclosure.

FIG. 7 is a timing diagram 700 of globally inconsistent checkpointing according to an embodiment of the disclosure. The diagram 700 shows iteration times $t_1$-$t_{k+3}$ such as the iteration times 240 progressing sequentially from left to right and shows devices $D_1$-$D_4$ such as the devices 110-130 and 310-330 progressing sequentially from top to bottom. Globally inconsistent checkpointing means that devices save snapshots at different iteration times and independently of each other. Independently means that, for instance, the device $D_1$ saving a snapshot at an iteration time does not dictate that the devices $D_1$-$D_4$ also save snapshots at the same iteration time. The devices $D_1$-$D_4$ save snapshots in a volatile manner, meaning in a main memory such as random-access memory (RAM). This contrasts a persistent manner in which the devices $D_1$-$D_4$ save snapshots in a secondary storage such as a hard disk.

Thus, at the iteration time $t_i$ the devices $D_1$ and $D_3$ save first snapshots, and at the iteration time $t_{i+1}$ the devices $D_2$ and $D_4$ save first snapshots. In addition, the device $D_1$ transmits its first snapshot to the device $D_4$, the device $D_2$ transmits its first snapshot to the device $D_3$, the device $D_3$ transmits its first snapshot to the device $D_1$, and the device $D_4$ transmits its first snapshot to the device $D_2$. The time period from iteration time $t_i$ to iteration time $t_{i+2}$ in which each of the devices $D_1$-$D_4$ saves and transmits its first snapshot is referred to as a first checkpoint.

Similarly, at the iteration time $t_k$ the devices $D_1$ and $D_2$ save second snapshots, at the iteration time $t_{k+1}$ the device $D_3$ saves its second snapshot, and at the iteration time $t_{k+2}$ the device $D_4$ saves its second snapshot. Once again, the device $D_1$ transmits its second snapshot to the device $D_4$, the device $D_2$ transmits its second snapshot to the device $D_3$, the device $D_3$ transmits its second snapshot to the device $D_1$, and the device $D_4$ transmits its second snapshot to the device $D_2$. The time period from iteration time $t_k$ to iteration time $t_{k+3}$ in which each of the devices $D_1$-$D_4$ saves and transmits its second snapshot is referred to as a second checkpoint. For any iteration time after the iteration time $t_{k+3}$, the last available snapshot for the device $D_1$ is at the iteration time $t_k$, the last available snapshot for the device $D_2$ is at the iteration time $t_k$, the last available snapshot for the device $D_3$ is at the iteration time $t_{k+1}$, and the last available snapshot for the device $D_4$ is at the iteration time $t_{k+2}$.

As shown, the devices perform globally inconsistent checkpointing in at least two manners. First, during the first checkpoint and the second checkpoint, the devices $D_1$-$D_4$ save and transmit snapshots at different iteration times. Specifically, during the first checkpoint, the devices $D_1$-$D_4$ save and transmit snapshots at different iteration times, namely $t_i$ and $t_{i+1}$. Similarly, during the second checkpoint, the devices $D_1$-$D_4$ save and transmit snapshots at different iteration times, namely $t_k$ and $t_{i+2}$. Second, the first checkpoint and the second checkpoint are inconsistent with each other. Specifically, during the first checkpoint, the device $D_4$ saves and transmits a snapshot at the iteration time $t_{i+1}$ which is one iteration time after the iteration time $t_i$, the first iteration time during the first checkpoint. In contrast, during the second checkpoint, the device $D_4$ saves and transmits a snapshot at the iteration time $t_{k+2}$, which is two iteration times after the iteration time $t_k$, the first iteration time during the second checkpoint. Viewed in a different manner, the device $D_4$ saves and transmits snapshots at different intervals of time so that there may be five iterations between a first snapshot and a second snapshot, six iterations between the second snapshot and a third snapshot, and so on.

Devices such as the devices 310-330 perform globally inconsistent checkpointing in response to any suitable instruction. For example, a controller such as the controller 350 instructs the devices 310-330 to perform globally inconsistent checkpointing. As a first alternative, the controller 350 instructs the devices 310-330 to perform checkpointing in a manner that the devices 310-330 choose. As a second alternative, the devices 310-330 are pre-configured to perform globally inconsistent checkpointing. As a third alternative, a user of the devices 310-330 instructs the first device 310 to perform globally inconsistent checkpointing, and the first device 310 forwards that instruction to the devices 320-330. As a fourth alternative, the devices 310-330 coordinate among each other and determine to perform globally inconsistent checkpointing. The decision to perform globally inconsistent checkpointing may be based on local conditions in the devices 310-330 such as how frequently the devices 310-330 fail, network conditions such as network utilization, or other criteria. For example, if the controller 350 detects that the devices 310-330 are failing frequently or if the controller 350 detects that the network 300 is experiencing unbalanced network utilization, then the controller 350 may instruct the devices 310-330 to perform globally inconsistent checkpointing.

The devices 310-330 obtain a schedule to perform globally inconsistent checkpointing in any suitable manner. For instance, the controller 350 provides schedules for the devices 310-330 to perform globally inconsistent checkpointing. As a first alternative, the controller 350 instructs the devices 310-330 to create their own schedule. As a second alternative, the devices 310-330 are pre-configured with their own schedules. As a third alternative, a user of the devices 310-330 provides the schedules. As a fourth alternative, the devices 310-330 coordinate among each other to determine the schedules. The schedules may be based on local conditions in the devices 310-330 such as how frequently the devices 310-330 fail, network conditions such as network utilization, or other criteria. As a first example, if the controller 350 detects that the first device 310 is failing frequently, then the controller 350 may instruct the first device 310 to perform globally inconsistent checkpointing more frequently than the devices 320-330. As a second example, if the controller 350 detects that the network 300 is experiencing unbalanced network utilization, then the controller 350 may provide schedules for the devices 310-330 to perform globally inconsistent checkpointing in a manner that balances the network utilization.

A staleness of a snapshot refers to a number of iterations times subsequent to that snapshot. Looking at FIG. 7, at the iteration time $t_{k+6}$, the staleness of the second snapshot for the device $D_1$ is therefore equal to 5 because the number of iterations between the iteration time $t_k$ and the iteration time $t_{k+5}$ is 5. The iteration time $t_{k+6}$ is not included in the calculation because the calculation is for the staleness at the iteration time $t_{k+6}$. Similarly, at the iteration time $t_{k+6}$, the staleness of the second snapshot for the device $D_2$ is 5, the staleness of the second snapshot for the device $D_3$ is 4, and the staleness of the second snapshot for the device $D_4$ is 3. Staleness may therefore vary among the devices 310-330 due to the globally inconsistent checkpointing. The controller 350 may instruct the devices 310-330 to have the same or different stalenesses. Alternatively, the devices 310-330 are pre-configured with the stalenesses, a user provides the devices 310-330 with the stalenesses, or the devices 310-330 coordinate among each other to determine the stalenesses.

Though each of the devices 310-330 may have varying stalenesses, they may have the same maximum staleness. The controller 350 may instruct the devices 310-330 to have the maximum staleness. Alternatively, the devices 310-330 are pre-configured with the maximum staleness, a user provides the devices 310-330 with the maximum staleness, or the devices 310-330 coordinate among each other to determine the maximum staleness. The devices 310-330 ensure compliance with the maximum staleness by saving and transmitting snapshots so that each snapshot has a staleness that is less than or equal to the maximum staleness.

The devices 310-330 perform minimum recovery for asynchronous processing. The controller 350 may instruct the devices 310-330 on how to perform recovery. For example, at pre-determined times, upon receiving instructions from the controller 350, or at other suitable times, the devices 310-330 transmit heartbeat messages to the controller 350 in order to indicate that the devices 310-330 are still alive and functioning properly. If the controller 350 does not receive at an expected time a heartbeat message from one of the devices 310-330, for instance the first device 310, then the controller 350 determines that the first device 310 has failed. The controller 350 then commands the devices 320-330 to perform minimum recoveries. Specifically, the controller 350 instructs the devices 320-330 not to roll back, in other words to continue using their current inputs, and instructs the devices 320-330 to assume the processing of a sub-graph associated with the first device 310 using the first device's 310 inputs from the first device's 310 last snapshot, which may be from the last completed checkpoint. A completed checkpoint is a checkpoint where all of the devices 310-330 save snapshots.

Looking at FIG. 7, if the device $D_3$ fails at the iteration time $t_{k+6}$, then the devices $D_1$-$D_2$ and $D_4$ perform minimum recovery. Specifically, the devices $D_1$-$D_2$ and $D_4$ continue using their current inputs and assume the processing of a sub-graph associated with the device $D_3$ using the device $D_3$'s inputs from the device $D_3$'s second snapshot from the second checkpoint, which is the last completed checkpoint. The devices $D_1$-$D_2$ and $D_4$ then process the sub-graph associated with the device $D_3$ until convergence. The iteration time for the final vertex values is therefore greater than the iteration time $t_{k+6}$, which ensures progressive reading.

If multiple devices 310-330 fail, then the devices 310-330 perform minimum recovery beginning with the device 310-330 with the earliest snapshot, which ensures progressive reading. Looking at FIG. 7, if the device $D_1$ and the device $D_4$ both fail at the iteration time $t_{k+6}$, then the devices $D_2$-$D_3$ perform minimum recovery. Because the device $D_1$ took its second snapshot at the iteration time $t_k$ and the device $D_4$ took its second snapshot at the iteration time $t_{k+2}$, which is after the iteration time $t_k$, the devices $D_2$-$D_3$ perform minimum recovery beginning with the device $D_1$. Specifically, the devices $D_2$-$D_3$ continue using their current inputs and assume processing of a sub-graph associated with the device $D_1$ using the device's $D_1$ inputs from the device's $D_1$ second snapshot from the second checkpoint, which is the last completed checkpoint. In addition, the devices $D_2$-$D_3$ use the device's $D_4$ inputs from the device's $D_4$ second snapshot from the second checkpoint. The devices $D_2$-$D_3$ then process the sub-graph associated with the device $D_1$ until convergence. After doing so, the devices $D_2$-$D_3$ process a sub-graph associated with the device $D_4$ using their current inputs and the inputs from the converged sub-graph associated with the device $D_1$.

Figure 8:
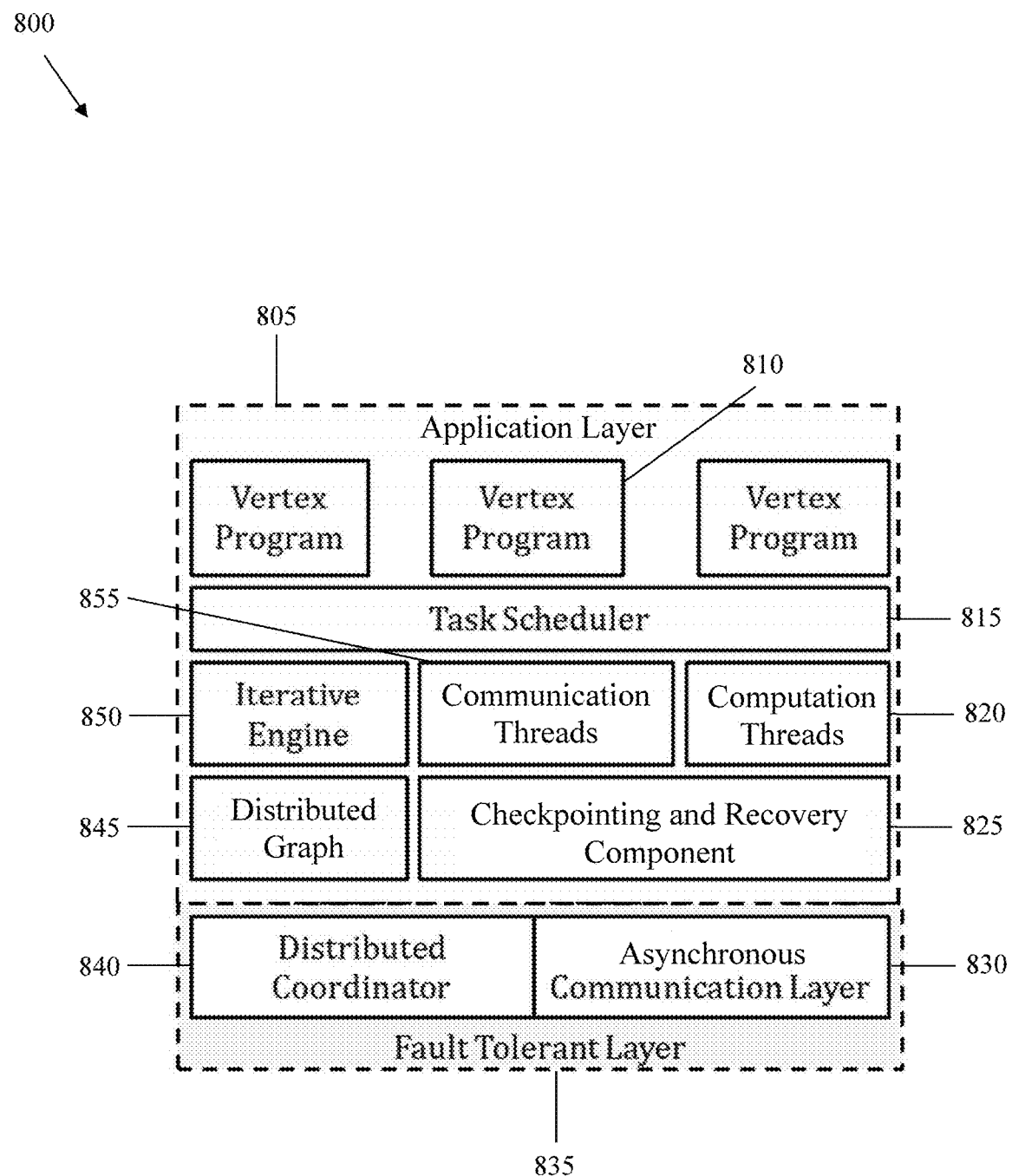
FIG. 8 is a logical diagram of a distributed graph processing network according to an embodiment of the disclosure.

FIG. 8 is a logical diagram of a distributed graph processing network 800 according to an embodiment of the disclosure. The network 800 generally comprises an application layer 805 and a fault tolerant layer 835. The application layer 805 and the fault tolerant layer 835 are logical layers. The devices 310-330 implement the application layer 805 and the fault tolerant layer 835. The controller 350 may further implement the application layer 805 and the fault tolerant layer 835.

The application layer 805 processes distributed graphs such as the graph 200 as described above. The application layer 805 comprises vertex programs 810, a task scheduler 815, computation threads 820, a checkpointing and recovery component 825, a distributed graph 845, an iterative engine 850, and communication threads 855. The vertex programs 810 are programs that solve a problem for any suitable context using the distributed graph 845. For example, the vertex programs 810 are the social media network users and relationships or the webpages and hyperlink problems. The task scheduler 815 schedules processing of vertex values when edges change. The computation threads 820 are sequences of programmed instructions that perform distributed graph processing. The computation threads 820 reside in the devices 310-330 or logical or physical partitions of the devices 310-330. The checkpointing and recovery component 825 implements checkpointing, stalenesses, a maximum staleness, and minimum recovery. The distributed graph 845 is any suitable distributed graph such as the graph 200 that comprises sub-graphs with vertices and vertex values, the latter of which correspond to sums of edges. The iterative engine 850 implements iterative processing of vertex values so that each of the devices 310-330 independently performs iterative processing. The communication threads 855 are sequences of programmed instructions that communicate packets for distributed graph processing. The communication threads 855 reside in the devices 310-330 or logical or physical partitions of the devices 310-330.

The fault tolerant layer 835 maintains the application layer 805 when the devices 310-330 fail. The fault tolerant layer 835 comprises an asynchronous communication layer 830 and a distributed coordinator 840. The asynchronous communication layer 830 assists the devices 310-330 in communicating in a non-blocking manner using, for instance, ZeroMQ distributed messaging over a publisher-subscriber model. The asynchronous communication layer 830 separates a data channel and a control channel, uses a multi-cast model for the data channel, and uses a point-to-point model for the control channel. The distributed coordinator 840 uses, for instance, Apache Zookeeper to detect failures of the devices 310-330, inform the checkpointing and recovery component 825 of such failures, and provide barriers. A barrier is a synchronization mechanism that dictates that threads must stop at a time and cannot proceed until all other threads reach the time.

FIG. 9 is a graph 900 illustrating the performance of globally inconsistent checkpointing and minimum recovery. The graph 900 is the result of a distributed graph processing network of 5 devices implementing a page rank vertex program with 4.8 million vertices and 69 million edges. The network took 45 seconds to initiate. The total processing time without any device failure was 70 seconds. The graph 900 shows processing times after a simulated device failure after 45 seconds of processing. The total processing time without fault tolerance was 210 seconds. With fault tolerance, the graph 900 compares a first setup with globally consistent checkpointing and maximum recovery to a second setup globally inconsistent checkpointing and minimum recovery. When there is no checkpoint, the first setup has a total processing time of 130 seconds for a 16.7 percent (%) time savings compared to no recovery. The second setup has a total processing time of 115 seconds for a 23.8% savings compared to no recovery and a 7.1% savings compared to the first setup. When there is a checkpoint after 30 seconds, the first setup has a total processing time of 110 seconds for a 26.2% time savings compared to no recovery. The second setup has a total processing time of 84 seconds for a 38.6% savings compared to no recovery and a 12.4% savings compared to the first setup. Fault tolerance implementing globally inconsistent checkpointing and minimum recovery therefore provides a significant improvement in processing time.

Figure 10:
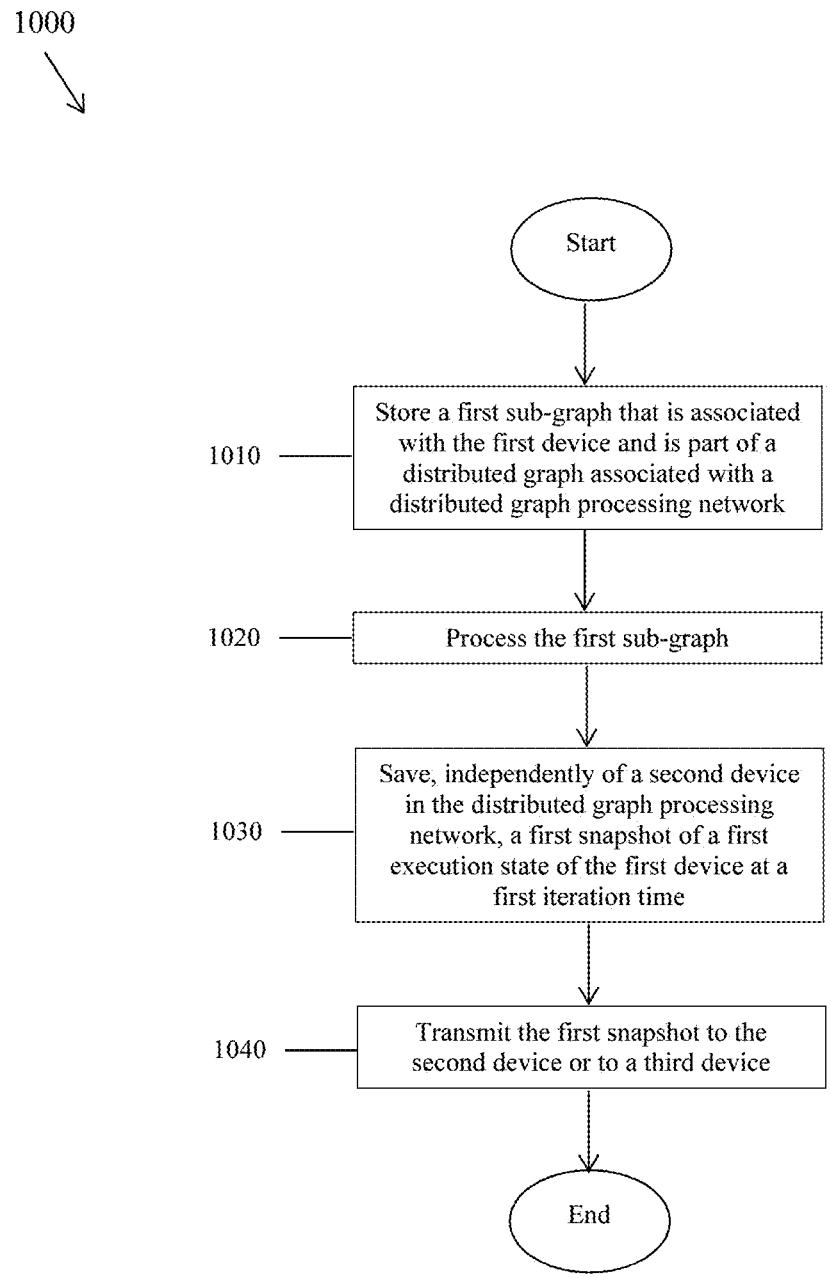
FIG. 10 is a flowchart illustrating a method of globally inconsistent checkpointing according to an embodiment of the disclosure.

FIG. 10 is a flowchart illustrating a method 1000 of globally inconsistent checkpointing according to an embodiment of the disclosure. One of the devices 310-330 performs the method 1000. At step 1010, a first sub-graph that is associated with the first device and is part of a distributed graph associated with a distributed graph processing network is stored. For instance, the first device 310 stores the first sub-graph 210 that is associated with the first device 310 and is part of the distributed graph 200 associated with the distributed graph processing network 300. At step 1020, the first sub-graph is processed. For instance, the first device 310 processes the first sub-graph 210 towards convergence. At step 1030, a first snapshot of a first execution state of the first device at a first iteration time is saved independently of a second device in the distributed graph processing network. For instance, the first device 310 saves the first snapshot independently of the second device 320. Finally, at step 1040, the first snapshot is transmitted to the second device or a third device. For instance, the first device 310 transmits the first snapshot to the second device 320 or the controller 350.

Figure 11:
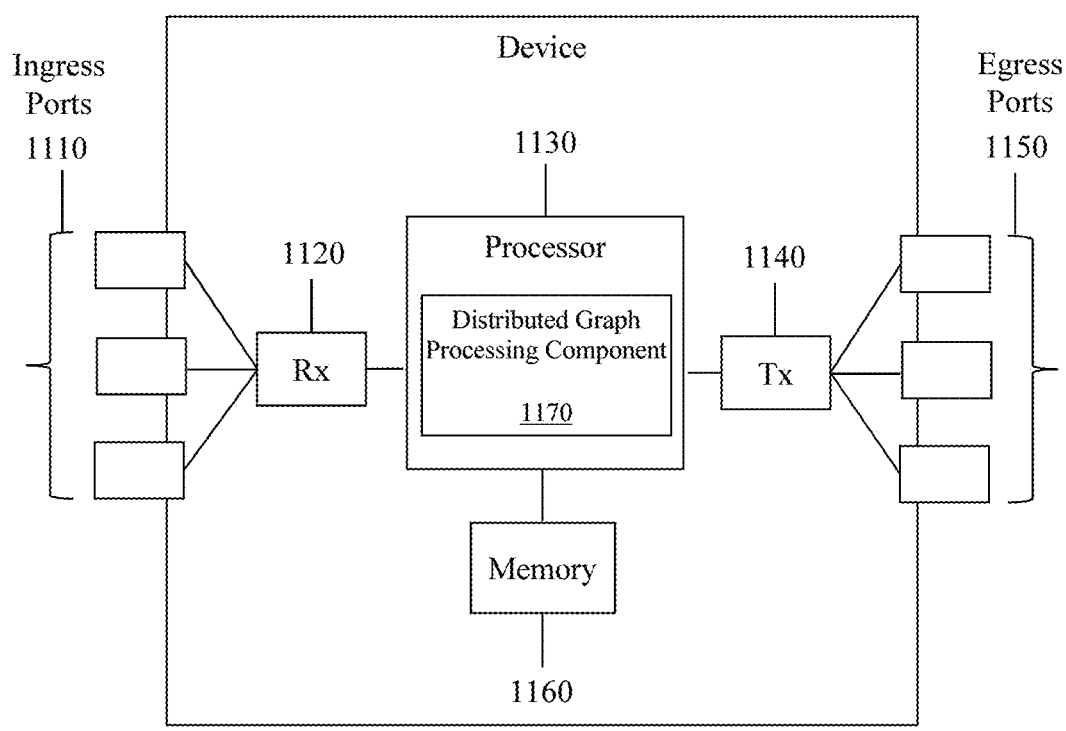
FIG. 11 is a schematic diagram of a device according to an embodiment of the disclosure.

FIG. 11 is a schematic diagram of a device 1100 according to an embodiment of the disclosure. The device 1100 is suitable for implementing the disclosed embodiments. The device 1100 comprises ingress ports 1110 and receiver units (Rx) 1120 for receiving data; a processor, logic unit, or central processing unit (CPU) 1130 to process the data; transmitter units (Tx) 1140 and egress ports 1150 for transmitting the data; and a memory 1160 for storing the data. The device 1100 may also comprise optical-to-electrical (OE) components and electrical-to-optical (EO) components coupled to the ingress ports 1110, the receiver units 1120, the transmitter units 1140, and the egress ports 1150 for ingress or egress of optical or electrical signals.

The processor 1130 is implemented by any suitable combination of hardware, middleware, firmware, and software. The processor 1130 may be implemented as one or more CPU chips, cores (e.g., as a multi-core processor), field-programmable gate arrays (FPGAs), application specific integrated circuits (ASICs), and digital signal processors (DSPs). The processor 1130 is in communication with the ingress ports 1110, receiver units 1120, transmitter units 1140, egress ports 1150, and memory 1160. The processor 1130 comprises a distributed graph processing component 1170. The distributed graph processing component 1170 implements the disclosed embodiments. The inclusion of the distributed graph processing component 1170 therefore provides a substantial improvement to the functionality of the device 1100 and effects a transformation of the device 1100 to a different state. Alternatively, the distributed graph processing component 1170 is implemented as instructions stored in the memory 1160 and executed by the processor 1130. The processor 1130, the memory 1160, or both may store the method 1000 so that the device 1100 may implement the method 1000.

The memory 1160 comprises one or more disks, tape drives, and solid-state drives and may be used as an overflow data storage device, to store programs when such programs are selected for execution, and to store instructions and data that are read during program execution. The memory 1160 may be volatile and non-volatile and may be read-only memory (ROM), RAM, ternary content-addressable memory (TCAM), and static random-access memory (SRAM).

In an example embodiment, a first device comprises a memory element configured to store a first sub-graph that is part of a distributed graph associated with a distributed graph processing network; and a processing element coupled to the memory and configured to process the first sub-graph; and save, independently of a second device in the distributed graph processing network, a first snapshot of a first execution state of the first device at a first iteration time; and a transmitting element coupled to the processor and configured to transmit the first snapshot to the second device or to a third device.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A first device comprising: a transmitter; a memory having stored therein instructions and a first sub-graph of a distributed graph associated with a distributed graph processing network; and a processor in communication with the transmitter and with the memory, the processor executing the instructions to: save a first snapshot of the first sub-graph at a first iteration time during a first checkpoint, the first snapshot comprises vertex values and edge values of the first sub-graph, the first iteration time is different from a second iteration time during the first checkpoint when a second device in the distributed graph processing network saves a second snapshot of a second sub-graph of the distributed graph, a checkpoint is a period of time during which all devices processing the distributed graph save a snapshot, and the first snapshot and the second snapshot are for performing a recovery of failed devices; and transmit the first snapshot to the second device or to a third device.

2. The first device of claim 1, wherein the processor further executes the instructions to process the first sub-graph in an asynchronous manner.

3. The first device of claim 1, wherein the second device is a distributed graph processing device.

4. The first device of claim 1, wherein the third device is a controller.

5. The first device of claim 1, wherein the processor further executes the instructions to save snapshots based on how frequently the first device fails.

6. The first device of claim 1, wherein the processor further executes the instructions to save a third snapshot at a third iteration time during a second checkpoint, the third iteration time is different from a fourth iteration time during the second checkpoint when the second device saves a fourth snapshot.

7. The first device of claim 6, wherein the processor further executes the instructions to save a fifth snapshot of a fifth execution state of the first device at a fifth iteration time so that a first interval between the first iteration time and the third iteration time is different from a second interval between the third iteration time and the fifth iteration time.

8. The first device of claim 6, wherein the third iteration time ensures compliance with a maximum staleness.

9. The first device of claim 8, further comprising a receiver, wherein the processor executes the instructions to receive an instruction to implement the maximum staleness.

10. A method implemented in a first device, the method comprising: storing a first sub-graph that is associated with the first device and is part of a distributed graph associated with a distributed graph processing network; saving a first snapshot of the first sub-graph at a first iteration time during a first checkpoint, the first snapshot comprises vertex values and edge values of the first subgraph, the first iteration time is different from a second iteration time during the first checkpoint when a second device in the distributed graph processing network saves a second snapshot of a second sub-graph of the distributed graph, a checkpoint is a period of time during which all devices processing the distributed graph save a snapshot, and the first snapshot and the second snapshot are for performing a recovery of failed devices; and transmitting the first snapshot to the second device or to a third device.

11. The method of claim 10, further comprising further processing the first sub-graph in an asynchronous manner.

12. The method of claim 10, further comprising receiving the second snapshot from the second device.

13. The method of claim 10, further comprising:
determining that the second device failed; and
processing until convergence the second sub-graph,
wherein the second sub-graph is associated with the second device.

14. A controller comprising:
a memory comprising instructions; and
a processor in communication with the memory, wherein the processor executes the instructions to:
control a first device, a second device, and a third device, wherein the first device, the second device, and the third device are part of a distributed graph processing network,
determine that the second device has failed,
determine that the third device has failed,
instruct a minimum recovery among the first device, the second device, and the third device by instructing the second device and the third device, but not the first device, to roll back to their last snapshots,
determine a last completed checkpoint,
determine a second time of a second snapshot of the second device during the last completed checkpoint,
determine a third time of a third snapshot of the third device during the last completed checkpoint,
make a determination that the second time is before the third time,
order the second snapshot before the third snapshot based on the determination,
instruct, until a second convergence, the first device to process a second sub-graph associated with the second device using second inputs of the second device from the second snapshot, and
instruct, after completion of the second convergence and until a third convergence, the first device to process a third sub-graph associated with the third device using third inputs of the third device from the third snapshot.

15. The controller of claim 14, wherein the processor further executes the instructions to further determine that the second device has failed when the processor fails to receive a second heartbeat message from the second device at a second expected time.

16. The controller of claim 15, wherein the processor further executes the instructions to further determine that the third device has failed when the processor fails to receive a third heartbeat message from the third device at a third expected time.

17. A method implemented in a controller, the method comprising:

controlling a first device, a second device, and a third device, wherein the first device, the second device, and the third device are part of a distributed graph processing network;
determining that the second device has failed;
determining that the third device has failed;
instructing a minimum recovery among the first device, the second device, and the third device by instructing the second device and the third device, but not the first device, to roll back to their last snapshots;
determining a last completed checkpoint;
determining a second time of a second snapshot of the second device during the last completed checkpoint;
determining a third time of a third snapshot of the third device during the last completed checkpoint;
making a determination that the second time is before the third time;
ordering the second snapshot before the third snapshot based on the determination;
instructing, until a second convergence, the first device to process a second sub-graph associated with the second device using second inputs of the second device from the second snapshot; and
instructing, after completion of the second convergence and until a third convergence, the first device to process a third sub-graph associated with the third device using third inputs of the third device from the third snapshot.

18. The method of claim 17, further comprising further determining that the second device has failed upon failing to receive a second heartbeat message from the second device at a second expected time.

19. The method of claim 18, further comprising further determining that the third device has failed upon failing to receive a third heartbeat message from the third device at a third expected time.

* * * * *